May 25, 1965     R. A. McCREANOR     3,185,024
METHOD AND APPARATUS FOR OPTICALLY MEASURING
THE THICKNESS OF THIN TRANSPARENT FILMS
Filed March 8, 1962     3 Sheets-Sheet 1
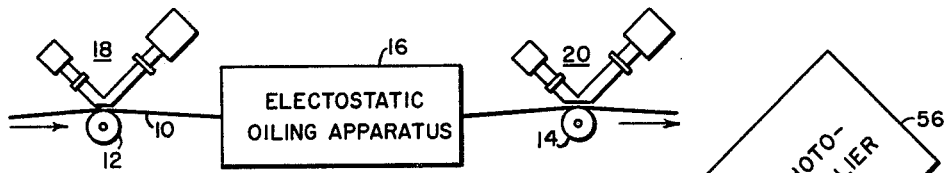
Fig. 1.
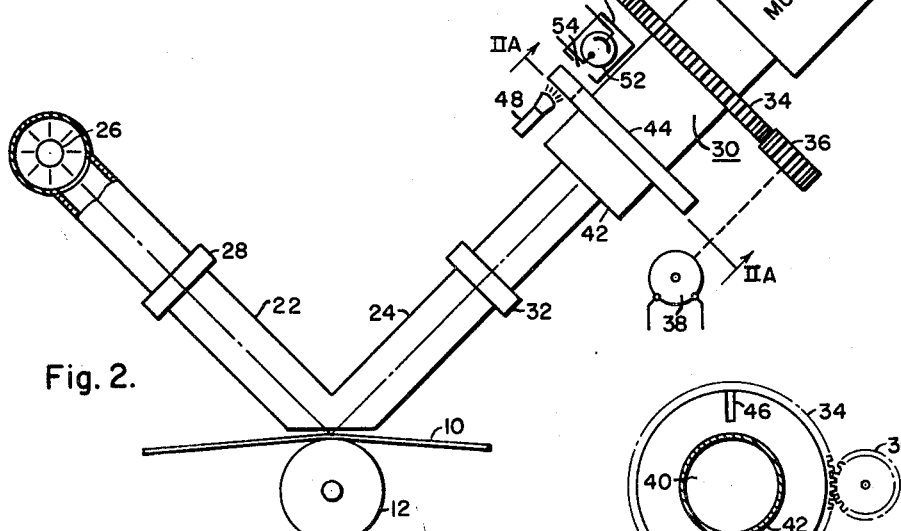
Fig. 2.
Fig. 2A.
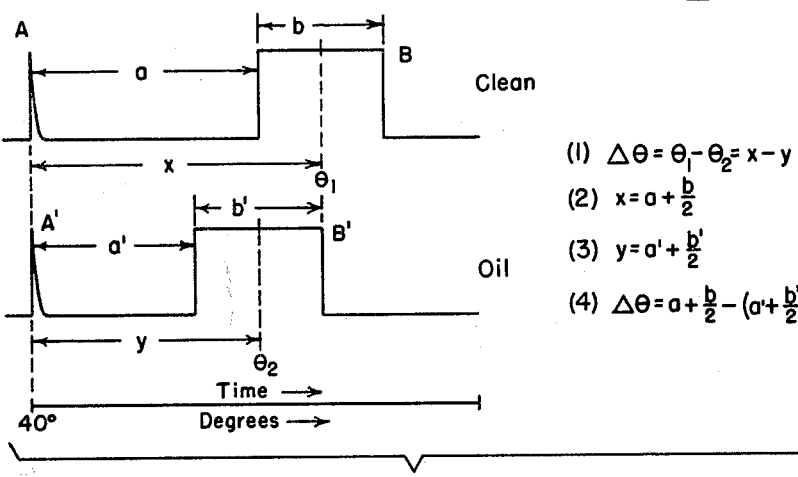
(1) $\Delta\theta = \theta_1 - \theta_2 = x - y$
(2) $x = a + \frac{b}{2}$
(3) $y = a' + \frac{b'}{2}$
(4) $\Delta\theta = a + \frac{b}{2} - (a' + \frac{b'}{2})$
Fig. 3.
INVENTOR
Richard A. McCreanor
BY
ATTORNEYS INVENTOR
Richard A. McCreanor
ATTORNEYS INVENTOR
Richard A. McCreanor
ATTORNEYS

United States Patent Office 3,185,024
Patented May 25, 1965

3,185,024
METHOD AND APPARATUS FOR OPTICALLY MEASURING THE THICKNESS OF THIN TRANSPARENT FILMS
Richard A. McCreanor, Baldwin, Pa., assignor to Donart Electronics Inc., Pittsburgh, Pa., a corporation of Pennsylvania
Filed Mar. 8, 1962, Ser. No. 178,322
11 Claims. (Cl. 88—14)

This invention relates to a method and apparatus for measuring the thickness of thin transparent films on reflective surfaces, and more particularly to apparatus for continuously measuring the thickness of an oil coating applied to moving tin plate.

During the production of various metallic strip products, they are frequently given a very thin oil coating for purposes of protection or handling. As an example, tin plate is usually oiled at a point in the operation just prior to rolling into the finished coil form. Many subsequent manufacturing operations require a known thickness of oil; and it has generally been recognized, particularly in the steel industry, that the control of this oil thickness is an important problem. That is, the coating must be thick enough to prevent marring of the surface during shipment and handling, yet thin enough so that it will not interfere with printing or lacquering of the surface. The coating range is usually specified in terms of grams per basebox, where a "basebox" is 31,360 square inches of tin plate, with a total surface area of 62,720 square inches on both sides of the plate. Tin plate is usually produced with coatings in the range of about 0.05 through 0.50 grams per basebox, each 0.10 gram per basebox corresponding to about one ten millionth of an inch or 26 angstrom units. In order to avoid marring or scratching due to too little oil, or processing difficulties due to excessive oil, the application of this coating should be controlled within about plus or minus 0.05 grams per basebox or about 13 angstrom units.

In the past, various methods have been devised for measuring oil coating weights and thicknesses. All of these methods, however, require that measurements be taken on a sample of the tin plate cut from a continuous strip passing through a tin plate processing line. As will be understood, such procedures are not altogether satisfactory since they yield information on only a small area of the strip and not on the main portion of the strip, nor do they facilitate adjustment of the oil coating apparatus to correct for an off-standard condition during the processing operation.

The present invention is concerned with apparatus for measuring oil coating thickness immediately after the oil has been applied, thus enabling the operators to determine much more rapidly whether the coating thickness they are obtaining is satisfactory in time to take such corrective steps as may be necessary. This offers a considerable advantage over the methods previously in use where the oil coating was determined sometime after the product had been completed and too late to take any corrective steps.

In accordance with the invention, there are provided two reading heads, preferably ellipsometers, one positioned along the path of a continuously moving strip of tin plate ahead of the oil coating apparatus, and a second located beyond the oil coating apparatus. In each ellipsometer, plane polarized light is directed onto the surface of the reflective strip of tin plate. The reflected light from the surface of the tin plate is elliptically polarized, and the ellipticity of this reflected light depends upon the angle of incidence, the wave length, and the plane of polarization of the incident light, and upon the optical constants of the metallic reflecting surface. Furthermore, the ellipticity of the reflected light is altered by the presence of any film on the metal surface, depending upon the optical constants of the film and its thickness. By passing the reflected beam of elliptically polarized light through a quarter-wave plate and an analyzer, the plane of polarization of the reflected light can be determined by rotating the analyzer until a null or maximum is reached (i.e., the point of minimum or maximum light intensity passing through the analyzer).

The necessity for two ellipsometers, one located ahead of and one beyond the oil coating apparatus becomes apparent when it is remembered that the oil coating thickness on tin plate must be determined in the presence of a second film consisting of a substrate of tin oxide of unknown thickness. Furthermore, since tin crystals are optically anisotropic, the state of polarization of the reflected light is dependent upon the orientation of the tin crystals with respect to the incident light beam. Accordingly, in order to determine the thickness of the film, it is necessary to take a differential reading, with and without the film on the metal. The film thickness is then related to the difference of the planes of polarization of the reflected light for the two readings.

In accordance with another aspect of the invention, the analyzer in each of the ellipsometers ahead of and beyond the oil coating apparatus is continuously rotated in one direction. Light passing through the analyzer is then applied to a photomultiplier or the like such that the output of the photomultiplier will be an alternating current signal having a phase and an amplitude above and below a zero axis dependent upon the plane of polarization of the reflected light passing through the aforesaid quarter-wave plate. Also provided on each ellipsometer is means for producing a voltage pulse at least one during each revolution of the analyzer, with each pulse occurring at the same angular position of the analyzer. The alternating current signal and the voltage pulses are then used to derive an electrical signal which varies as a function of the plane of polarization of the reflected light in each ellipsometer ahead of and beyond the oil coating apparatus. Thereafter, by electrically subtracting these signals, a resultant signal is produced which is proportional to the thickness of the oil film. The magnitude of this electrical signal may then be visually displayed and/or used to control the oil coating apparatus to produce a uniform coating having a predetermined thickness.

The above and other objects and features of the invention will become apparent from the following detailed description taken in connection with the accompanying drawings which form a part of the specification and in which:

FIGURE 1 shows a section of a tinning line immediately preceding and following the point where oiling is accomplished;

FIG. 2 is a schematic illustration of ellipsometer apparatus of the type used in the present invention;

FIG. 2A is a cross sectional taken along line IIA—IIA of FIG. 2;

FIG. 3 is a graphical illustration of the operation of the invention;

Figure 4:
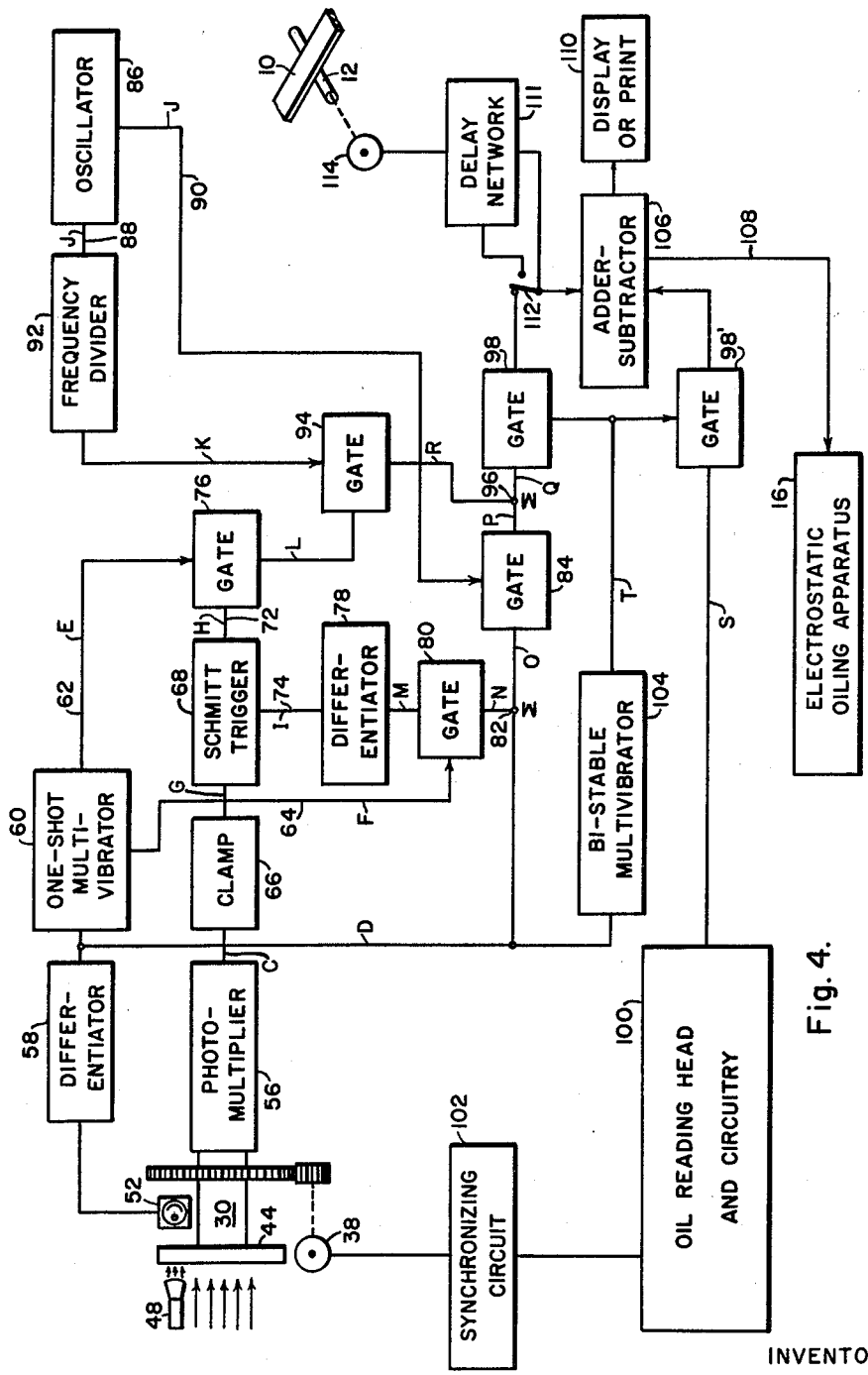
FIG. 4 is a schematic block diagram of the electrical circuitry for converting variations in light intensity passing through the analyzers of FIG. 1 into an electrical signal proportional to the thickness of an oil coating on the tin plate after it has passed through the oiling apparatus.

Referring now to the drawings, and particularly to FIG. 1, the numeral 10 designates a continuosly traveling strip of tin plate which has already been cleaned and brightened and otherwise prepared for oiling. As shown, the strip 10 passes over two idler rolls 12 and 14 which are arranged such that the tin plate passing over them is under sufficient tension to maintain its position constant in the vertical plane. That is, the tin plate is effectively stretched taut over the idler rolls. Between the idler rolls 12 and 14 is oil coating apparatus 16 which, in the usual case, is of the electrostatic type wherein an electrostatic charge is produced on the strip such that the oil will be attracted to the strip and coat the same. Above each of the idler rolls 12 and 14 is an ellipsometer 18 and 20, the ellipsometer 18 serving to take readings on the tin plate without the oil coating applied, and the ellipsometer 20 serving to take readings with the coating applied. As was mentioned above, this is necessary due to the fact that a differential reading is required because of the optical anisotropic and other characteristics of the tin plate surface.

Referring now to FIG. 2, the ellipsometer 18, for example, comprises a pair of tubular shafts 22 and 24 which lie in a common plane and intersect above the idler roll 12. The bottoms of shafts 22 and 24 are open above the roll 12 to permit light to be directed onto the traveling tin plate 10. The end of shaft 22 opposite the opening above the strip 10 is exposed to a source of a monochromatic light, such as a sodium lamp 26, while a Nicol prism polarizer 28 is inserted in the tubular shaft 22 between sodium lamp 26 and the strip 10, substantially as shown. On the end of the tubular shaft 24 opposite the strip 10 is a Nicol prism analyzer 30 which consists, essentially, of a polarizer rotatable about a central axis. Between the analyzer 30 and the tin plate 10 is a compensator or quarter-wave plate 32 which converts elliptically polarized light reflected from strip 10 into plane polarized light which is then directed into the analyzer 30. Surrounding the analyzer and connected thereto is a gear 34 which meshes with a pinion gear 36, this latter gear being continuously rotated in one direction by an electric motor, schematically illustrated at 38.

With reference to FIG. 2A, it will be seen that the analyzer 40 itself is carried within a rotatable tubular housing 42. Surrounding the housing 42 is an annular flange 44 having a slot or aperture 46 provided at one point in its periphery, although two slots, spaced 180° apart, may be provided if desired. A light source 48 (FIG. 2) is provided at one point around the periphery of the analyzer 30; while directly opposite the light source 48 is a chamber 50 which houses a photocell 52. Provided in the housing 50 is a slot 54. Since this slot is directly opposite the light source 48, and since the annular flange 44 is opaque except for the slot 46, light will pass through the slots 46 and 54 and will impinge upon the photocell 52 once during each revolution of the analyzer 30, thereby causing the photocell 52 to produce an output pulse. This results in a series of output pulses having a frequency equal to the rotational frequency of the analyzer, with each pulse occurring at the same angular position of the analyzer.

The output of the monochromatic light source 26 is collimated; however, after passing through the Nicol prism polarizer 28, it is plane polarized, and this plane polarized light impinges upon the surface of the continuously traveling tin plate strip 10. After being reflected from the strip 10, the light beam is elliptically polarized, and this elliptically polarized beam is then passed through the quarter-wave plate 32 which converts the light back into plane polarized light. The plane polarized light is then directed into the analyzer 30; and the plane of polarization of this light is a function of the tin plate surface and also a function of any oil coating which might be present. Thus, a different plane of polarization exists for the clean reading head 18 and the oil reading head 20, this difference in plane of polarization being proportional to oil coating thickness.

After passing through the analyzer 30, the resulting light is directed onto the photomultiplier 56 or other similar light amplitude detector. As the analyzer 30 is continuously rotated by motor 38, the light intensity passing therethrough will vary from a minimum to a maximum at an angle of 90° with respect to the minimum position and will then decrease again to a minimum at an angle of 180° with respect to the original minimum position. In the second half revolution of the analyzer, the foregoing variation in light intensity is repeated so that the output of the photomultiplier will be an alternating current signal. Furthermore, the phase of this signal and its amplitude above and below a zero axis will be dependent upon the plane of polarization of the light directed onto the analyzer.

FIG. 3 illustrates the principle of the present invention in measuring the angular shift of the plane of polarization due to the addition of oil to the tin plate. The upper waveform (clean) shows a spike A at 40°. This spike is obtained when the slit 46 on the rotating Nicol prism analyzer flange 44 passes the path of light between source 48 and the photocell 50 of FIG. 2. Rectangular pulse B centered around $\theta_1$ represents a shaped output from the photomultiplier 56 of FIG. 2. The distance between the spike A and the center of the rectangular pulse B is a function of the rotation of the plane of polarization as seen by the rotating Nicol prism. This distance $x$, when added to the point where the indexing pulse A occurs (in this case at 40°), provides the angular location of the clean null. That is, it provides the angular location of the analyzer 30 where the light intensity passing therethrough is at a minimum. Similarly, $\theta_2$ represents the null for the oil reading, and the distance $y$ added to the indexing pulse A' (also at 40°) represents the angular location of the oil null.

Equation No. 1 of FIG. 3 thus represents the expressions for obtaining $\Delta\theta$, which represents the angular shift of the null due to the coating thickness of the oil. Neither $x$ nor $y$ can be conveniently measured. Equation 2 and Equation 3 are expressions for $x$ and $y$, respectively, which can be measured with common digital techniques. These expressions assume that the rectangular waveforms B and B' can be obtained and are symmetrical about $\theta_1$ and $\theta_2$. Thus, $\Delta\theta$ can be expressed as $$a+\frac{b}{2}-\left(a'+\frac{b'}{2}\right)$$

The waveforms B and B' can be obtained from the output of the photomultiplier 56 through the use of a Schmitt trigger and appropriate gating and other electronic circuits.

Figure 5:
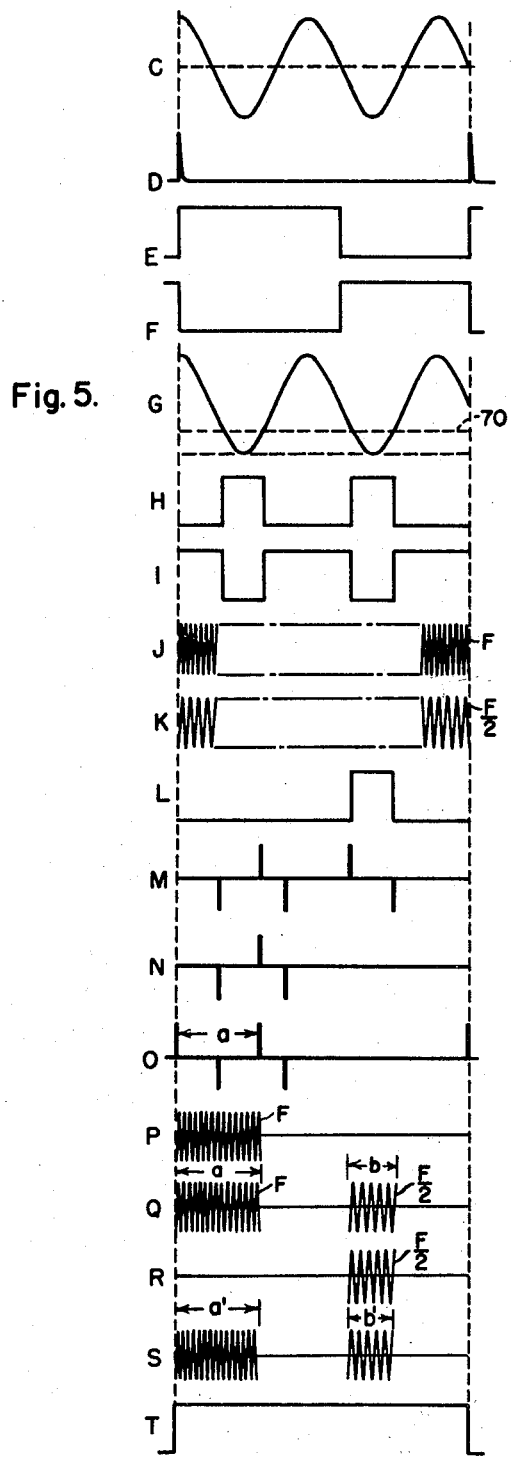
FIG. 5 illustrates waveforms appearing at various points in the circuit of FIG. 4.

One possible circuit for obtaining the proper waveforms is shown in FIG. 4, the operation of the circuit being best understood by reference to FIG. 5. The output of the photomultiplier 56 is a sine wave as was explained above, the phase of this sine wave being dependent upon the plane of polarization of the light incident on the analyzer 30, as well as the amplitude of the sine wave above and below a zero axis. The output of the photoelectric cell 52 may be applied to a differentiator 58 to produce spiked pulses appearing as waveform D in FIG. 5, these spiked pulses occurring at least once during each revolution of the analyzer and at the same angular position of the analyzer. In certain cases, the differentiator 58 may not be necessary if the pulses from the photocell 52 are sufficiently narrow in width. The output of the differentiator 58 is applied to a one-shot multivibrator 60. As is well known to those skilled in the art, the one-shot multivibrator 60 is a circuit for producing an output pulse of fixed width each time an input pulse is applied thereto. It comprises a pair of electron valves connected such that one valve will conduct while the other is cut off and vice versa. By deriving an output signal from each one of the valves, one signal will be inverted with respect to the other. Thus, two output signals are derived from one-shot multivibrator 60 on leads 62 and 64, the signal on lead 62 appearing as waveform E in FIG. 5 and that on lead 64 appearing as waveform F.

Reverting, now, to the photomultiplier 56, its output signal (waveform C in FIG. 5) is applied to a clamp circuit 66 which clamps the amplitude of the sine wave output of the photomultiplier to zero or ground (waveform G, FIG. 5). From clamp 66, waveform G is applied to a Schmitt trigger, multivibrator 68. As is well known to those skilled in the art, the Schmitt trigger 68, like the one-shot multivibrator 60, comprises a pair of electron valves connected such that the one valve will conduct while the other is cut off and vice versa. In this case, however, the Schmitt trigger will change conduction from one valve to the other to produce an output pulse whenever the magnitude of the input signal applied thereto exceeds a predetermined level, the pulse persisting at the output of the circuit as long as the magnitude of the input voltage is above the said predetermined level. With reference to waveform G in FIG. 5, the predetermined level at which the Schmitt trigger multivibrator 68 fires is indicated by the line 70. Thus, the outputs from the two electron valves of the Schmitt trigger on leads 72 and 74 will appear as waveforms H and I in FIG. 5 where each pulse persists for the portion of the waveform G below the voltage level 70. The waveform H at the output of Schmitt trigger circuit 68 on lead 72 is gated by waveform E from the circuit 60 in gate circuit 76, the output of the gate circuit 76 appearing as waveform L in FIG. 5 wherein only one of the pulses of waveform H persists. Waveform I, on the other hand, is applied to a differentiator 78 to produce waveform M wherein a sharp pulse appears at the leading and trailing edge of each pulse in the original waveform I. These sharp pulses are then gated in gate circuit 80 with waveform F from one-shot multivibrator 60 to produce waveform N in FIG. 5 which is added at point 82 with the pulses in waveform D from differentiator 58 to produce waveform O, this latter waveform being applied to a gate circuit 84.

Included in the circuit of FIG. 4, at the upper right-hand portion thereof, is an oscillator 86 which produces an output signal on leads 88 and 90 appearing as waveform J in FIG. 5. Waveform J on lead 90 is applied to the gate circuit 84 and gated with waveform O to produce waveform P in FIG. 5 wherein oscillations persist for a period of time $(a)$, this period of time being equal to that period $(a)$ illustrated in FIG. 3. The output of oscillator 86 is also applied via lead 88 to a frequency divider 92 which divides the output frequency from oscillator 86 by two. The frequency divider may, for example, comprise a bistable multivibrator. Thus, the output of the frequency divider 92 will appear as waveform K in FIG. 5 which comprises an oscillatory signal having a frequency $(F/2)$ equal to one half the frequency of the oscillations $(F)$ in waveform J. The waveform K is gated with waveform L in gate circuit 94 to produce waveform R wherein oscillations at a frequency equal to half the frequency of the oscillations in waveform P persist for a period of time equal to the width of the pulse in waveform L, this width being equal to the time $(b)$ in FIG. 3. Waveforms P and R are added at point 96 to produce waveform Q, this waveform being fed to a gate circuit 98. Upon consideration of the waveform Q, it will be understood that if the oscillations in waveform P persist for a period $(a)$ at a frequency F, and if those oscillations in waveform R persist for a period $(b)$ at a frequency $F_2$, then the oscillations in waveform Q are equal to $$a+\frac{b}{2}$$

The circuitry thus far described is for the ellipsometer 18 shown in FIG. 1, while the circuitry for ellipsometer 20 with the oil film applied is indicated by the block identified by the reference numeral 100 in FIG. 4. The drive motors 38 for each ellipsometer may be synchronized by means of a circuit 102, meaning that the differentiator 58 in the oil reading head circuitry 100 will produce a waveform which is synchronized with waveform D in FIG. 5. Furthermore, the output of the oil reading head circuitry 100 may appear as a waveform S comprising two groups of oscillations, the first group having a frequency F and persisting for the time $a'$, and the second group having a frequency $F/2$ and persisting for a time $b'$. Thus, the oscillations in waveform S as related to the equations of FIG. 3, are equal to $$a'+\frac{b'}{2}$$

The output of differentiator 58 (i.e. waveform D in FIG. 5) is applied from either the clean or oil reading head to a bistable multivibrator 104 which produces an output signal appearing as waveform T in FIG. 5. This waveform is used to gate waveform Q in gate circuit 98 and also to gate waveform S in gate circuit 98'. The waveforms Q and S passing through gate circuits 98 and 98' are then applied to a digital adder-subtractor counter 106 which solves the equation $$\Delta\theta=a+\frac{b}{2}-\left(a'+\frac{b'}{2}\right)$$

Thus, the output of the adder-subtractor 106 on lead 108 is an electrical signal proportional to the thickness of the oil film applied to the strip 10 in passing through the oiling apparatus 16 of FIG. 1. This electrical signal may be applied to display or printing apparatus 110 or, it may be used to control the electrostatic oiling apparatus 16 in a servo loop arrangement such that the amount of oil applied to the strip will be decreased if the thickness of the oil film increases above a predetermined value and vice versa.

If the output waveforms Q and S are simultaneously applied to the added-subtractor 106, they will comprise readings on different portions of the strip 10. Since the anisotropic and other characteristics of the strip 10 may vary from the input to the output side of the oiling apparatus 16, it is sometimes desirable to introduce a delay network into the system, this delay network being identified by the numeral 111 in FIG. 4. As shown, the output of gate circuit 98 comprising waveform Q from the clean reading head may be applied through switch 112 either directly to the added-subtractor 106 or through the delay network 111 to the adder-subtractor 106. The delay network is controlled by means of a tachometer 114 connected, for example, to the idler roll 12, the arrangement being such that the delay effected by network 110 will vary as a function of the speed of strip 10. By selecting appropriate constants for the delay network 111, it will be appreciated that the signal from clean reading head 18 can be delayed by an amount of time required for the strip to travel from the head 18 to the head 20, thereby assuring that readings are being taken on the same, or approximately the same, portion of the strip. This will tend to eliminate any discrepancies which might arise due to different properties on the areas of the tin plate beneath the two reading heads.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In the method for measuring the thickness of a thin transparent film on the surface of reflective material, the steps of exposing the reflective material with the transparent film thereon to a beam of plane-polarized light thereby producing reflected beams of elliptically polarized light, converting the elliptically polarized light into plane polarized light, passing the latter-mentioned plane polarized light through a first analyzer, continuously rotating the first analyzer in one direction about an axis extending parallel to said reflected beams of polarized light, converting the light passing through said first analyzer into an electrical signal which varies as a function of the thickness of said transparent film, exposing the reflective material with the transparent film removed to a beam of plane polarized light to produce reflected beams of elliptically polarized light, converting the latter-mentioned elliptically polarized light into plane polarized light, passing the last-mentioned plane polarized light through a second analyzer while continuously rotating said second analyzer in one direction about an axis extending parallel to said latter-mentioned reflected polarized light, converting the light passing through said second analyzer into an electrical signal, and determining the thickness of the transparent film by a comparison of the electrical signals derived from the first and second analyzers.

2. In apparatus for determining the thickness of a thin transparent film applied to a continuously moving strip of reflective material by passing said material through film coating apparatus, the combination of first continually rotating analyzer means positioned adjacent said moving strip ahead of the coating apparatus and adapted to produce a first electrical signal which varies as a function of the ellipticity of polarized light reflected from the strip without the film applied, second continually rotating analyzer means positioned adjacent the moving strip beyond the coating apparatus and adapted to produce a second electrical signal which varies as a function of the ellipticity of polarized light reflected from the strip with the film applied, and means responsive to said first and second electrical signals for producing an output electrical signal which varies as a function of the thickness of the film applied to the strip.

3. In apparatus for determining the thickness of a thin transparent film applied to a continuously moving strip of reflective material by passing said material through coating apparatus, the combination of first ellipsometer apparatus including a continually rotating analyzer positioned adjacent to said moving strip ahead of the coating apparatus and adapted to produce a first electrical signal which varies as a function of the state of polarization of polarized light reflected from the surface of the moving material before it passes through the coating apparatus, second ellipsometer apparatus including a continually rotating analyzer positioned adjacent the moving strip beyond the coating apparatus and adapted to produce a second electrical signal which varies as a function of the state of polarization of polarized light reflected from the surface of the moving material with the film applied, and means for producing an output electrical signal which varies as a function of the thickness of said film by comparison of said first and second signals.

4. In apparatus for applying an oil coating to a continuously moving strip of reflective material by passing said material through oil coating apparatus, the combination of first ellipsometer apparatus including a continually rotating analyzer positioned adjacent said moving strip ahead of the oil coating apparatus and adapted to produce a first electrical signal which varies as a function of the ellipticity of polarized light reflected from the surface of the moving material before it passes through the oil coating apparatus, second ellipsometer apparatus including a continually rotating analyzer positioned adjacent the moving strip beyond the oil coating apparatus and adapted to produce a second electrical signal which varies as a function of the ellipticity of polarized light reflected from the surface of the moving material with the oil coating applied, a device for controlling the amount of oil applied to the surface of the moving strip by said oil coating apparatus, and means responsive to said first and second electrical signals for controlling said device to produce an oil coating on the strip of a predetermined thickness.

5. In apparatus for determining the thickness of an oil coating applied to a continuously moving strip of reflective material by passing said material through oil coating apparatus, the combination of first ellipsometer apparatus including a continually rotating analyzer positioned adjacent said moving strip ahead of the oil coating apparatus for producing a first electrical signal which varies as a function of the plane of polarization of plane polarized light which has been converted from elliptically polarized light reflected from the surface of the moving material before it passes through the oil coating apparatus, second ellipsometer apparatus including a continually rotating analyzer positioned adjacent the moving strip beyond the oil coating apparatus and adapted to produce a second electrical signal which varies as a function of the plane of polarization of plane polarized light converted from elliptically polarized light reflected from the surface of the moving material with the oil coating applied, and means responsive to said first and second electrical signals for producing an output electrical signal which varies as a function of the thickness of said oil coating.

6. In apparatus for determining the thickness of a thin transparent film applied to a continuously moving strip of reflective material by passing said material through film coating apparatus, the combination of the first ellipsometer apparatus including a continually rotating analyzer positioned adjacent said moving strip ahead of the oil coating apparatus for producing a first electrical signal which varies as a function of the ellipticity of polarized light reflected from the surface of the moving material before it passes through the oil coating apparatus, second ellipsometer apparatus including a continually rotating analyzer positioned adjacent the moving strip beyond the oil coating apparatus and adapted to produce a second electrical signal which varies as a fuction of the ellipticity of polarized light reflected from the surface of the moving material with the film applied, means for delaying said first electrical signal by an amount substantially equal to the time required for the strip to travel between the first and second ellipsometer apparatus, and means responsive to the delayed first electrical signal and said second electrical signal for producing an output electrical signal which varies as a function of the thickness of said film.

7. In apparatus for determining the thickness of a thin transparent film on the surface of reflective material by the use of continually rotating analyzer apparatus and in accordance with the formula:

$$\Delta\theta = a + \frac{b}{2} - \left(a' + \frac{b'}{2}\right)$$

where $\Delta\theta$ is the difference in angular positions of the planes of polarization of beams of plane polarized light derived from elliptically polarized light reflected from the surface of the reflective material with and without the film applied, $a$ and $b$ represent degrees of rotation of the analyzer apparatus which vary as a function of the ellipticity of polarized light reflected from the material without the film applied, and $a'$ and $b'$ represent degrees of rotation of the analyzer apparatus which vary as a function of the ellipticity of polarized light reflected from the material with the film applied; the combination of means for deriving a first electrical signal which varies as a function of $$a + \frac{b}{2}$$

means for deriving a second electrical signal which varies as a function of $$a' + \frac{b'}{2}$$

and means for electrically subtracting the first and second signals to derive an output signal proportional to $\Delta\theta$.

8. In apparatus for determining the thickness of a thin transparent film on the surface of reflective material in accordance with the formula:

$$\Delta\theta = a + \frac{b}{2} - \left(a' + \frac{b'}{2}\right)$$

where $\Delta\theta$ is the difference in angular positions of the planes of polarization of beams of plane polarized light derived from elliptically polarized light reflected from the surface of the reflective material with and without the film applied, $a$ and $b$ are time intervals which vary as a function of the ellipticity of polarized light reflected from the material without the film applied, and $a'$ and $b'$ are time intervals which vary as a function of the ellipticity of polarized light reflected from the material with the film applied; the combination of means including an analyzer continually rotating in one direction about an axis extending parallel to beams of polarized light reflected from said material without the film applied for deriving a first electrical signal which varies as a function of $$a + \frac{b}{2}$$

means including a second analyzer continually rotating in one direction about an axis extending parallel to beams of polarized light reflected from said material with the film applied for deriving a second electrical signal which varies as a function of $$a' + \frac{b'}{2}$$

and means for electrically subtracting the first and second signals to derive an output signal proportional to $\Delta\theta$.

9. In apparatus for determining the thickness of a thin transparent film on the surface of reflective material in accordance with the formula:

$$\Delta\theta = a + \frac{b}{2} - \left(a' + \frac{b'}{2}\right)$$

where $\Delta\theta$ is the difference in angular positions of the planes of polarization of beams of plane polarized light derived from elliptically polarized light reflected from the surface of the reflective material with and without the film applied, $a$ and $b$ are time intervals which vary as a function of the ellipticity of polarized light reflected from the material without the film applied, and $a'$ and $b'$ are time intervals which vary as a function of the ellipticity of polarized light reflected from the material with the film applied; the combination of means including photoelectric means responsive to light passing through a first analyzer continuously rotating in one direction about an axis extending parallel to the path of polarized light reflected from the reflective material without the film applied for deriving a first electrical signal which varies as a function of $$a + \frac{b}{2}$$

means including photoelectric means responsive to light passing through a second continuously rotating analyzer rotatable about an axis extending parallel to the path of polarized light reflected from the surface of said material with the film applied for deriving a second electrical signals to derive an output proportional to $\Delta\theta$.

$$a' + \frac{b'}{2}$$

and means for electrically subtracting the first and second signals to derive an output signal proportional to $\Delta\theta$.

10. In apparatus for determining the thickness of a thin transparent film on the surface of reflective material by the use of continually rotating analyzer apparatus and in accordance with the formula:

$$\Delta\theta = a + \frac{b}{2} - \left(a' + \frac{b'}{2}\right)$$

where $\Delta\theta$ is the difference in angular positions of the planes of polarization of beams of plane polarized light derived from elliptically polarized light reflected from the surface of the reflective material with and without the film applied, $a$ and $b$ represent degrees of rotation of the analyzer apparatus which vary as a function of the ellipticity of polarized light reflected from the material without the film applied, and $a'$ and $b'$ represent degrees of rotation of the analyzer apparatus which vary as a function of the ellipticity of polarized light reflected from the material with the film applied; the combination of means for deriving a first digital electrical signal which varies as a function of $$a + \frac{b}{2}$$

means for deriving a second digital electrical signal which varies as a function of $$a' + \frac{b'}{2}$$

and means for digitally subtracting the first and second signals to derive a digital output signal proportional to $\Delta\theta$.

11. In apparatus for determining the thickness of a thin transparent film on the surface of reflective material in accordance with the formula:

$$\Delta\theta = a + \frac{b}{2} - \left(a' + \frac{b'}{2}\right)$$

where $\Delta\theta$ is the difference in angular positions of the planes of polarization of beams of plane polarized light derived from elliptically polarized light reflected from the surface of the reflective material with and without the film applied as determined by continually rotating analyzer apparatus, $a$ and $b$ represent degrees of rotation of the analyzer apparatus which vary as a function of the ellipticity of polarized light reflected from the material without the film applied, and $a'$ and $b'$ represent degrees of rotation of the analyzer apparatus which vary as a function of the ellipticity of polarized light reflected from the material with the film applied; the combination of means including said continually rotating analyzer apparatus for deriving a number of oscillations which vary in number as a function of $a$, means including said continually rotating analyzer apparatus for deriving a number of electrical oscillations which vary in number as a function of $$\frac{b}{2}$$

a first device for adding the number of oscillations which vary as a fuction of $a$ with those oscillations which vary as a function of $$\frac{b}{2}$$

means including said continually rotating analyzer apparatus for producing a number of oscillations which vary in number as a function of $a'$, means including said continually rotating analyzer apparatus for producing a number of oscillations which vary as a fuction of $$\frac{b'}{2}$$

a second device for adding the oscillations which vary as a function of $a'$ with those oscillations which vary as a function of $$\frac{b'}{2}$$

and means for digitally subtracting the output of one of said devices from the output of the other device to derive an output signal proportional to $\Delta\theta$.

(References on following page)

References Cited by the Examiner

UNITED STATES PATENTS

| | | | |
|---|---|---|---|
| 2,429,066 | 10/47 | Kuehni | 250—219.1 |
| 2,773,412 | 12/56 | Huck | 250—219.1 |
| 2,793,345 | 5/57 | Hags | 250—83.4 |
| 2,897,371 | 7/59 | Hasler | 250—52 |
| 2,943,210 | 6/60 | Jones | 88—14 |
| 2,964,633 | 12/60 | Bernstein | 250—83.4 |
| 2,965,762 | 12/60 | Turck | 88—14 |
| 2,993,402 | 7/61 | Dunipace et al. | 250—219.1 |
| 3,017,512 | 1/62 | Wolbert | 250—52 |

OTHER REFERENCES

Murray: "Automatic Optical Thickness Gage for Thin Film Measurements," The Review of Scientific Instruments, vol. 33, No. 2, February 1962, pages 172–176.

Rothen: "The Ellipsometer, an Apparatus to Measure Thickness of Thin Surface Films," The Review of Scientific Instruments, vol. 16, No. 2, February 1945, pages 26–30.

JEWELL H. PEDERSEN, *Primary Examiner.*

ARCHIE R. BORCHELT, *Examiner.*